US00RE45162E

(19) United States
(12) Reissued Patent
Hierzer

(10) Patent Number: US RE45,162 E
(45) Date of Reissued Patent: Sep. 30, 2014

(54) LIGHT

(71) Applicant: XAL GmbH, Graz (AT)

(72) Inventor: Andreas Hierzer, Graz (AT)

(73) Assignee: XAL GmbH, Graz (AT)

(21) Appl. No.: 29/439,750

(22) Filed: Dec. 14, 2012

Related U.S. Patent Documents

Reissue of:
(64) Patent No.: Des. 669,208
Issued: Oct. 16, 2012
Appl. No.: 29/389,390
Filed: Apr. 11, 2011

(30) Foreign Application Priority Data

Oct. 11, 2010 (EM) ..... 001766031-0004
Oct. 11, 2010 (EM) ..... 001766031-0006
Oct. 11, 2010 (EM) ..... 001766122-0001
Oct. 11, 2010 (EM) ..... 001766122-0002
Oct. 11, 2010 (EM) ..... 001766122-0003
Oct. 11, 2010 (EM) ..... 001766122-0004
Oct. 11, 2010 (EM) ..... 001766122-0005

(51) LOC (10) Cl. ..... 26-03
(52) U.S. Cl.
USPC ..... D26/89; D26/74
(58) Field of Classification Search
USPC ..... D26/59, 71, 72, 74, 76, 85, 87, 89, 90; D23/377, 379, 411; 362/147, 148, 365, 362/453, 454, 456, 455, 479, 483, 488, 490
See application file for complete search history.

(56) References Cited

U.S. PATENT DOCUMENTS

D187,082 S 1/1930 Parker et al.
D165,738 S 1/1952 Brochstein
D248,184 S 6/1978 Roberts
D394,518 S 5/1998 Burrow
D408,576 S 4/1999 Crosby
6,283,616 B1 9/2001 Zoroufy
D545,465 S 6/2007 Bachynsky et al.
D548,872 S 8/2007 Dubbeldam et al.
D567,426 S 4/2008 Chiu
7,740,367 B2 6/2010 Koren
D628,733 S 12/2010 Cobb et al.
D629,146 S * 12/2010 van den Akker ..... D26/89
D633,638 S 3/2011 Vincent
D635,711 S 4/2011 Scutella'
D640,821 S * 6/2011 Kocks ..... D26/89

OTHER PUBLICATIONS

Forecast, "Ovalle Collection 15", Retrieved Aug. 5, 2012, <eurostylelighting.com>.
Forecast "Ovalle" Collection 15" ceiling lights. Found at eurostylelighting.com visited Aug. 5, 2010.*

* cited by examiner

*Primary Examiner* — Phillip S Hyder
(74) *Attorney, Agent, or Firm* — Maschoff Brennan

(57) CLAIM

The ornamental design for a light, as shown and described.

DESCRIPTION

FIG. 1 is a lower perspective view of the light showing [our] *my* new design;
FIG. 2 is an upper perspective view thereof;
FIG. 3 is a side view thereof;
FIG. 4 is a top view thereof; and,
FIG. 5 is a bottom view thereof.

1 Claim, 5 Drawing Sheets

Figure 1:
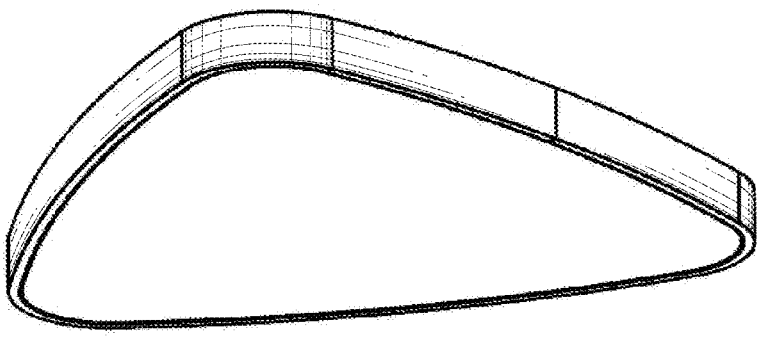
Figure 2:
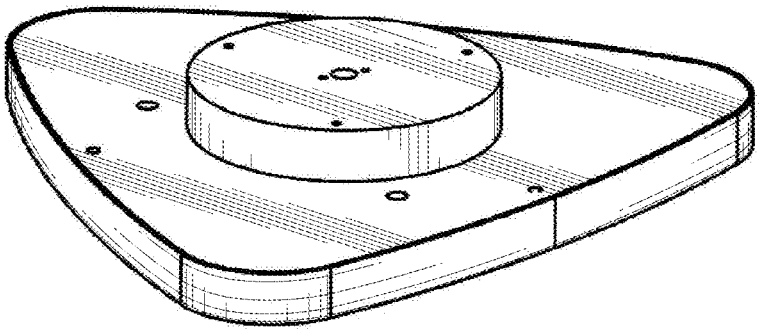
Figure 3:
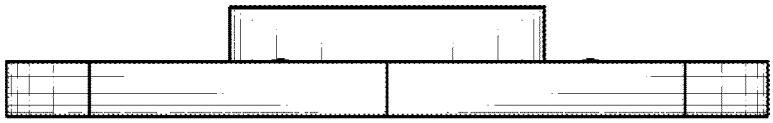
Figure 4:
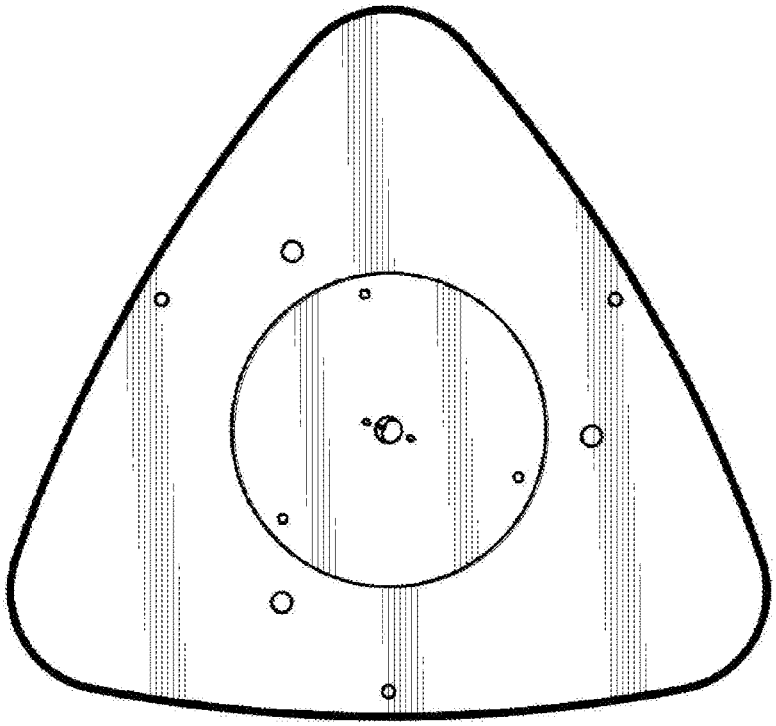
Figure 5:
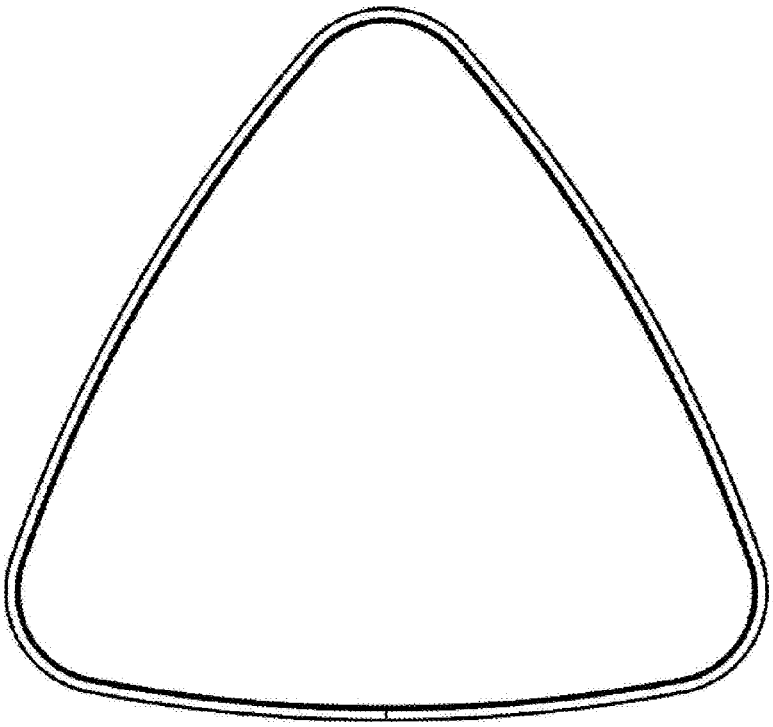

Matter enclosed in heavy brackets [ ] appears in the original patent but forms no part of this reissue; matter printed in italics indicates the additions made by reissue.